March 27, 1928.
M. WOODSOME
VAPORIZER FOR INTERNAL COMBUSTION ENGINES
Filed March 21, 1925
1,663,931
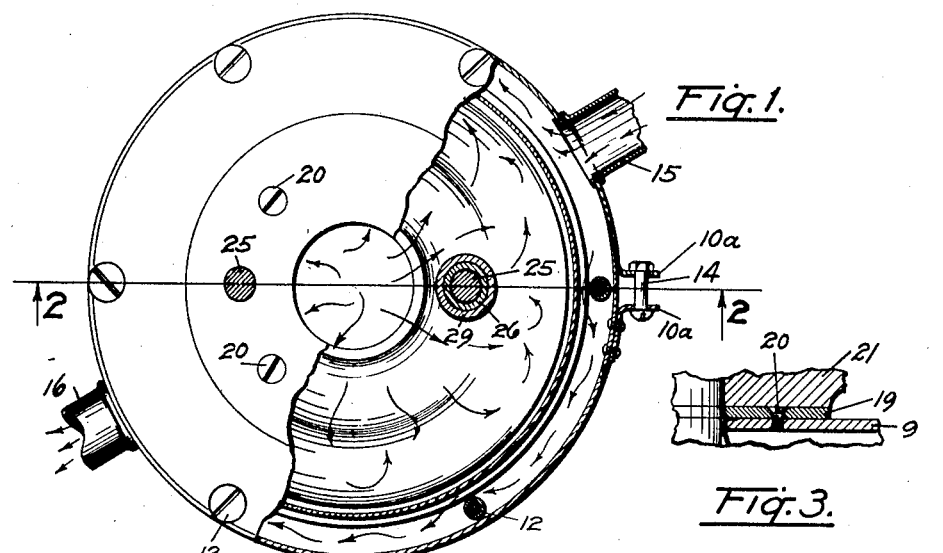
Fig. 1.
Fig. 3.
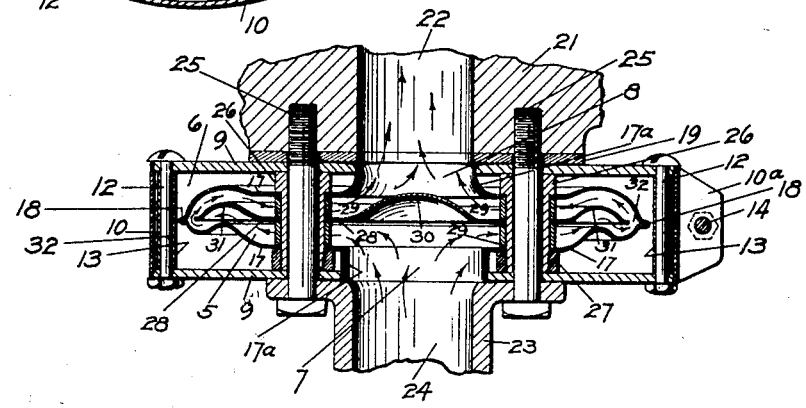
Fig. 2.
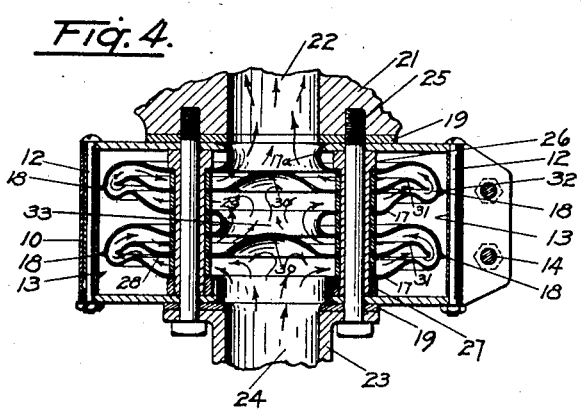
Fig. 4.
INVENTOR.
Millard Woodsome.
BY
ATTORNEY.

Patented Mar. 27, 1928.

1,663,931

UNITED STATES PATENT OFFICE.

MILLARD WOODSOME, OF LITTLETON, COLORADO, ASSIGNOR OF FIFTY-ONE ONE-HUNDREDTHS TO JAMES D. CANARY, OF LITTLETON, COLORADO.

VAPORIZER FOR INTERNAL-COMBUSTION ENGINES.

Application filed March 21, 1925. Serial No. 17,389.

This invention relates to vaporizers for internal combustion engines, and its primary object is to provide in connection with the carburetor in which the explosive mixture of air and hydrocarbons is produced, a device in which the flow of the mixture is disturbed in the presence of heat for the purpose of obtaining a substantially complete volatilization of its liquid particles and a more intimate incorporation of the gaseous components of the fuel before it is admitted to the cylinders of the engine.

I attain this object by the provision of means for the diffusion and retention of the gaseous fuel in a heated chamber intermediate of the carburetor and the intake manifold of the engine, through which the fuel passes into the cylinders, and it is a further object of the invention to attain this result by a device of simple and economical construction which is readily applied in operative relation to the parts of the engine with which the invention is associated.

An embodiment of the invention has been shown in the accompanying drawings in the several views of which like parts are similarly designated and in which Figure 1 represents a partially sectional plan view of the vaporizer in its preferred form;

Figure 2, a vertical section taken in the plane indicated by the line 2—2, in Figure 1;

Figure 3, an enlarged sectional detail showing the method of applying and fastening a finishing plate exteriorly of the vaporizer; and Figure 4, a section similar to that of Figure 2 showing on a reduced scale a modification of the invention in which its efficiency is increased by a multiplication of units in co-operative connection.

Referring more specifically to the drawings, the vaporizer as shown in Figures 1 and 2 comprises a diffusion chamber 5 enclosed in a heating jacket 6 and provided with openings for the ingress and egress of the gaseous fuel passing from the carburetor of the engine to the intake manifold or admission ports of the same.

The jacket 6 is formed by a casing composed of two circular end-plates 9 and a circumferential band 10 of resilient sheet-metal.

The plates 9 are connected in parallel spaced relation to each other by bolts 12 and distance sleeves 13, and the circumferential wall 10 is clamped in fluid-tight contact with the peripheral edges of the plates by a bolt 14 passing through registering apertures in lateral flanges 10$^a$ of its normally separated ends.

The band 10 is provided with openings at preferably opposite points in which are connected by means of swaged crimps, the ends of sheet-metal pipes 15 and 16 one of which connect the jacket with a source of heat such as the exhaust manifold of the engine.

The diffusion chamber 5 has two circular walls 17 of sheet-metal crimped together at their peripheral edges as at 18. The walls which are spaced apart to form a shallow chamber for the diffusion of the fuel, are provided with central openings 7 and 8 by outwardly projecting flanges 17$^a$ the end portions of which are turned around the edges of correspondingly formed openings in the end-plates 9 of the casing.

Annular finishing plates such as shown at 19 in Figures 2 and 4 may be fastened upon the outer surfaces of the plates of the casing by countersunk screws 20 for the twofold purpose of securing the ends of the flanges and of providing a smooth and true face for fluid tight engagement with the parts of the engine between which the vaporizer is applied.

In the drawings, 21 designates a portion of the engine body or intake manifold having an admission opening 22, and 23, a flanged part of the carburetor provided with the outlet-passage 24.

One of the finishing plates has been shown in Figure 2 in engagement with the corresponding face of the part 21 but no finishing plate has been applied at the opposite side of the vaporizer as being unnecessary when the surface of the part to which the device is attached is itself finished to the degree required to produce an air-tight joint.

The vaporizer is secured between the parts 21 and 23 of the engine by bolts 25 screwed into threaded openings in one of the parts and passing through headed bushings 26 inside the casing.

The bushings serve to support the walls of the diffusion chamber, in conjunction with collars 27 which may be screwed upon the ends thereof.

Disposed intermediate of the walls of the chamber 5 is a baffle or spreader plate 28 which in the operation of the invention causes the gaseous fuel to spread in a comparatively thin sheet and to follow a circuitous path around the peripheral edge of the plate in its course between the carburetor and the cylinders of the engine.

In the construction shown in the drawings, the plate 28 is held in place by sleeves 29 fitted around the bushings between the opposite faces of the plate and the wall members 17 of the chamber 5. The plate has a central depression or pocket 30 opposite the opening 7 of the chamber connecting with the carburetor, and it is furthermore provided with an annular depression 31 adjacent its peripheral edge which as stated hereinbefore is spaced from the walls of the chamber to provide an annular passage 32 for the fuel in its course from the carburetor to the cylinders of the engine, as has been indicated by arrows in Figures 1, 2 and 4 of the drawings.

The walls 17 of the chamber are curved in conformity with the annular depression 31 of the plate 28, thereby forming a fuel-course of undulating shape to promote the intermixture and vaporization of the constituents of the fuel as will hereinafter be more fully explained.

In the form of the invention illustrated in Figure 4, two diffusion chambers are assembled in one casing and secured by means similar to those hereinbefore described with reference to the construction shown in Figure 2.

The chambers are placed in communication with each other by a central neck 33 so that the gaseous fuel may pass from one to the other to complete the intermixture and vaporization of its constituents by a repeated diffusion and retention in the presence of the heating medium.

The mixture produced in the carburetor and forcibly withdrawn therefrom by the suction of the engine is brought into violent contact with the plate 28 in the chamber 5 and thereby diffused into a comparatively thin sheet which spreads radially to the peripheral edge of the plate, and through the annular passage 32 into the compartment of the chamber at the opposite side of the plate, through which it is drawn in similar form to the central opening connected with the intake manifold or admission opening of the engine.

The central pocket 30 of the plate and the annular depression 31 near the periphery thereof provide localized retention places which disturb the flow of the gaseous fluid and by a consequent whirling or agitative motion thereof, expedite and promote the thorough intermixture of its constituents.

The corresponding undulations of the walls of the chamber assist in directing the flow of gases to the retention spaces and the entire course above and below the baffle plate being thus tortuously formed retards the flow of the fluid with an attendant agitative action which not only causes its constituents to be thoroughly intermixed but which also breaks the globules of liquid discharged with the gases from the carburetor of the engine and causes the mixture to remain in constant contact with the heated surfaces.

During these entire actions the fuel is subjected to the heat of the exhaust gases passing through the jacket 6 with the result that when the fuel reaches the cylinders of the engine its originally liquid hydrocarbonaceous constituents are completely vaporized.

The construction of the vaporizer permits of its being composed of thin sheet metal, which is not only of economical value but which has also considerable merit in that it facilitates and expedites the conduction of the heat from the fluid in the jacket to the fuel passing through the chamber or chambers.

The construction moreover renders every part of the device readily accessible for cleaning or repairs and it is to be understood that it is open to such changes in the arrangement and form of its parts as may be found to be of advantage within the scope of the invention.

Having thus described my invention, what I claim and desire to secure by Letters Patent is:

1. A vaporizer for internal combustion engines comprising a cylindrical casing having concentric inlet and outlet openings and adapted to receive exhaust gases, a chamber arranged within the casing and consisting of peripherally connected disks and having central openings and provided therein with outwardly extending flanges connected with the casing at the central openings thereof, and a spreader consisting of a disk arranged within the chamber in spaced relation with the said disks and providing a narrow peripheral passage, said disks having annular undulations and the spreader disk being provided at the center with a concavo-convex portion located opposite the said openings in said chamber.

2. A vaporizer for internal combustion engines, comprising a circular chamber larger in diameter than the diameter of the intake manifold to function as a diffusion chamber having an inlet opening and an outlet opening at opposite sides thereof, and a thin disk of a diameter greater than the diameters of the said openings and less than that of the chamber and mounted within the chamber between the said openings so as to function as a spreader for the fuel mixture, said disk being so formed as to provide a concavo-convex depression therein between the inlet and outlet openings of the chamber, and a heating jacket surrounding the chamber.

3. A vaporizer for internal combustion engines comprising a shallow circular chamber larger in diameter than the diameter of the intake manifold to function as a diffusion chamber having a central inlet opening and a central outlet opening at opposite sides thereof and a circular disk of a diameter smaller than the chamber mounted concentrically therein between the said openings, so as to function as a spreader for the fuel mixture, the walls of the chamber and the said disk being so formed as to provide corresponding annular concave-convex depressions to provide a tortuous radial course for the fuel from the inlet opening to the outlet opening, and a heating jacket surrounding the chamber.

4. A vaporizer for internal combustion engines comprising a chamber larger in diameter than the diameter of the intake manifold to function as a diffusion chamber, said chamber being composed of peripherally connected disks having openings for the inlet and outlet of fuel, and a circular disk of a diameter greater than the said openings and less than the said chamber to form a spreader for the fuel mixture and to provide a peripheral passage for the said fuel mixture, a casing surrounding the chamber having openings connected with those of the chamber, bolts passing through the said disks, headed bushings around the bolts, and collars cooperating with the bushings to fix the chamber within the said casing.

5. A vaporizer for internal combustion engines comprising a chamber larger in diameter than the diameter of the intake manifold to function as a diffusion chamber, said chamber being composed of peripherally connected disks having openings for the inlet and outlet of fuel, and a circular disk of a diameter greater than the said openings and less than the said chamber to form a spreader for the fuel mixture and to provide a peripheral passage for the said fuel mixture, a casing surrounding the chamber having openings connected with those of the chamber, bolts passing through the said disks, headed bushings around the bolts, collars cooperating with the bushings to fix the chamber within the said casing, and sleeves around the bushings to fix the spreader disk within the chamber.

6. A vaporizer for internal combustion engines comprising a chamber larger than the diameter of the intake manifold to function as a diffusion chamber having openings at opposite sides thereof for the inlet and outlet of fuel, a casing surrounding the chamber and having openings connected with those of the said chamber, a disk of a diameter slightly smaller than the chamber to provide a peripheral passage for the fuel mixture and of greater diameter than the diameters of the said openings so as to function as a spreader for the fuel mixture, means for spacing the casing, the chamber and the spreader disk from one another, and bolts passing through the disk, the chamber and the casing and carrying the said spacing means.

7. A vaporizer for internal combustion engines comprising a chamber composed of peripherally connected disks having openings for the inlet and outlet of fuel, a spreader in the chamber consisting of a thin disk arranged in spaced relation with the said disks, a casing having openings connected with those of the chamber, bolts passing through the casing and the chamber, headed bushings around the bolts, and collars co-operating with the bushings to fix the chamber relative to the casing.

In testimony whereof I have affixed my signature.

MILLARD WOODSOME.